United States Patent [19]
He

[11] Patent Number: 5,911,772
[45] Date of Patent: Jun. 15, 1999

[54] APPARATUS AND METHOD FOR MINIMIZING TRANSIENT FILTER EFFECTS ON SPEED SIGNAL DATA

[75] Inventor: Chuan He, Columbus, Ind.

[73] Assignee: Cummins Engine Company, Inc., Columbus, Ind.

[21] Appl. No.: 08/970,793

[22] Filed: Nov. 14, 1997

[51] Int. Cl.$^6$ .................................................. G01M 15/00
[52] U.S. Cl. .......................... 701/110; 73/116; 123/419; 123/436
[58] Field of Search .................................... 701/101, 110, 701/111; 73/116, 117.2, 117.3, 118.1; 123/419, 436

[56] References Cited

U.S. PATENT DOCUMENTS

| | | | |
|---|---|---|---|
| 3,942,365 | 3/1976 | Hanson et al. | 73/116 |
| 3,994,160 | 11/1976 | Hanson | 73/116 |
| 4,501,138 | 2/1985 | McCandless | 73/116 |
| 5,574,217 | 11/1996 | McCombie | 701/110 |
| 5,606,119 | 2/1997 | Wallerand et al. | 73/117.3 |
| 5,616,834 | 4/1997 | Lynch et al. | 73/116 |
| 5,663,495 | 9/1997 | Allen et al. | 73/117.3 |
| 5,691,469 | 11/1997 | Mezger et al. | 73/117.3 |
| 5,699,253 | 12/1997 | Puskorius et al. | 701/111 |
| 5,752,213 | 5/1998 | Bryant et al. | 701/111 |

*Primary Examiner*—George Dombroske
*Attorney, Agent, or Firm*—Woodard, Emhardt, Naughton, Moriarty & McNett

[57] ABSTRACT

A vehicle/engine speed data collection and preprocessing method and apparatus comprises obtaining speed signal data, typically from a speed sensor; computing a linear equation of the speed signal data; adding artificial data to the speed signal data in accordance with the linear equation; filtering the speed signal data having the artificial data added thereto; and removing the filtered artificial data from the filtered data. The technique minimizes the transient effects of filtering, particularly at the data boundaries.

14 Claims, 3 Drawing Sheets

APPARATUS AND METHOD FOR MINIMIZING TRANSIENT FILTER EFFECTS ON SPEED SIGNAL DATA

FIELD OF THE INVENTION

This invention relates generally to the processing of speed data from an engine and/or vehicle, and more specifically to techniques for reducing transient effects of filtering on speed signal data.

BACKGROUND OF THE INVENTION

The processing of engine and/or vehicle speed signals is fundamental to the operation of today's vehicles. This data is crucial in performing many functions. For example, such information is typically used to control and/or measure various engine operating parameters, such as the engine acceleration, torque, and fuel injection, to name a few.

One example of a specific use of speed data input to a computer for processing is for the servicing and testing of engines. The computer that collects and processes speed signal data, along with other vehicle data, is linked to an SAE (Society of Automotive Engineers) J1587 Bus that operates in accordance with technical specifications set forth in the SAE J1587 standard. The J1587 Bus enables ready access to engine/vehicle data and performance information processed and computed by the computer. This information may then be used to ensure, for example, that the engine meets specifications regarding engine output torque and power requirements.

Various devices have been employed to gather and process speed signals. In U.S. Pat. No. 3,942,365 to Hanson et al., the speed of the engine is measured by a tachometer, which generates an electric pulse for each engine cycle. A computer measures the time periods between pulses to calculate engine speed. In U.S. Pat. No. 4,501,138 to McCandless, a data processor receives the speed signal from an unmounted engine using a frequency to DC voltage converter. The converter is programmed to smooth raw data using the data collected.

It is known in the art that speed signal sensing devices produce noisy speed data, and it is necessary to filter the speed signal data to reduce the noise normally associated with it. One disadvantage associated with filtering engine speed signal data is that such filtering tends to produce filtered data that deviates from the actual engine speed, particularly at the boundaries of the data collection period. This is due to a transient effect associated with the filter, and this effect becomes increasingly pronounced as the data is more heavily filtered. Thus, the filtered data may not be useful over its entire range due to this transient effect, particularly near the data boundaries.

Prior art speed signal processing devices do not adequately address this deficiency with filtered speed signal data. Thus, when testing engine or vehicle speeds, it is necessary to extend data collection periods in order to obtain a sufficient amount of data to measure various performance characteristics that rely on the speed data. This results in longer testing times, which may still yet produce additional corrupted speed data.

What is therefore needed is a technique for gathering filtered engine/vehicle speed signals that addresses the foregoing shortcomings. Such a technique should be reliable, inexpensive to implement, and readily integratable into an existing speed signal processing system.

SUMMARY OF THE INVENTION

The present invention addresses the foregoing shortcomings in filtering speed signal data. In accordance with the present invention, a technique for preprocessing engine and vehicular speed signal data is disclosed wherein the transient effects of filtering is minimized, particularly at the data boundaries. The technique comprises the steps of: (1) gathering speed signal data; (2) computing a linear equation of speed signal data; (3) adding artificial data to the speed signal data in accordance with the linear equation; (4) filtering the speed signal data having the artificial data added thereto; and (5) removing the filtered artificial data from the filtered speed signal data. The preprocessed filtered data may then be used more effectively by various control systems of the vehicle. The preprocessed filtered data may also be used more effectively for the analysis and measurement of various vehicular or engine performance characteristics.

One object of the present invention is to provide a technique for preprocessing speed signal data that reduces transient effects of filtering on the data, particularly near the data boundaries.

Another object of the present invention is to provide a technique for preprocessing speed signal data that is readily integratable into an existing control system.

It is yet another object of the present invention to reduce the time and expense in gathering engine/vehicle speed data.

These and other objects of the present invention will become more apparent from the following description of the preferred embodiment.

DESCRIPTION OF THE PREFERRED EMBODIMENT

Figure 1:
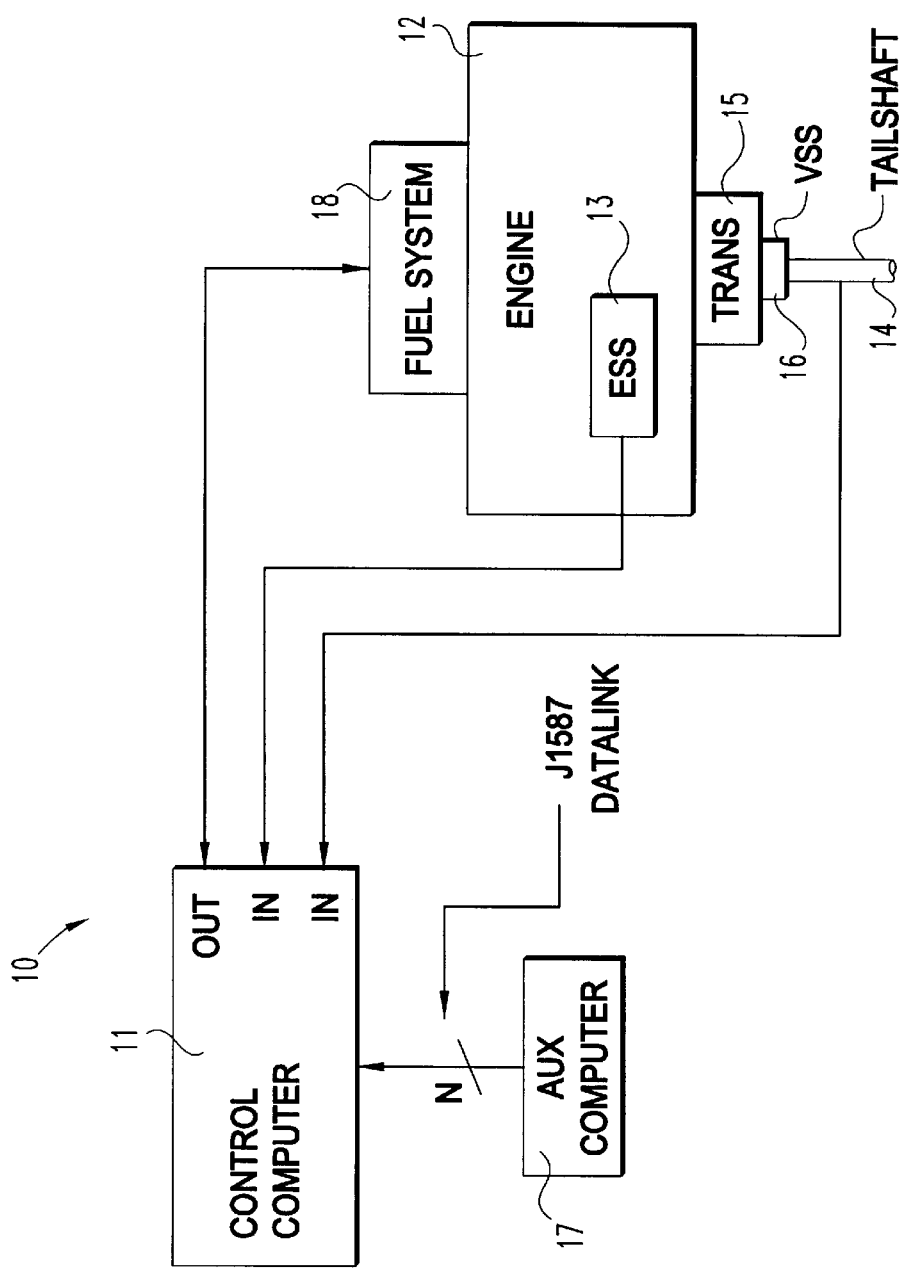
FIG. 1 is a block diagram illustration of an engine/vehicle speed signal control system in accordance with the present invention.

For the purposes of promoting an understanding of the principles of the present invention, reference will now be made to the embodiments illustrated in the drawings and specific language will be used to describe the same. It will nevertheless be understood that no limitation of the scope of the present invention is thereby intended, such alterations and further modifications in the illustrated systems, and such further applications of the principles of the present invention as illustrated therein being contemplated as would normally occur to one skilled in the art to which the present invention relates.

Referring now to FIG. 1, a vehicle/engine speed control system 10 in accordance with the present invention is shown. Control system 10 includes a known control computer 11 operable to control at least an internal combustion engine 12 as is known in the art. Engine 12 is connected to a transmission 15 in a known manner, wherein transmission 15 has a tailshaft 14 extending therefrom. Transmission 15 is operable as is known in the art to rotate tailshaft 14 to provide a driving force to a wheel assembly (not shown).

Engine 12 includes an engine speed sensor 13 which provides engine speed signals to control computer 11 as is known in the art. Likewise, a vehicle speed sensor 16 provides vehicle speed signals to control computer 11 as is known in the art. Control computer 11 is linked to an auxiliary computer 17 via a known serial communications bus. In one embodiment, the bus is a known SAE J1587 Datalink Bus, which allows the data in control computer 11 to be readily accessed via auxiliary computer 17.

Vehicle speed sensor 16 provides electronic signal of vehicle speed to the inputs of control computer 11. In one embodiment, vehicle speed sensor 16 is a variable reluctance sensor operable to sense rotational speed of a gear, or tone wheel, connected to tailshaft 14, for example. It is to be understood, however, that vehicle speed may be derived from other known sensors, such as a wheel speed sensor, or the like, and be positioned at any other location which provides a suitable indication of vehicle speed.

Likewise, engine speed sensor 13 provides electronic signals of engine speed to the inputs of control computer 11. Engine speed sensor 13 is operable to sense the rotational speed and/or engine position of a gear, or tone wheel, connected to a component of engine 12, such as a driveshaft (not shown). Alternatively, engine speed sensor 13 may be connected at any engine component that provides a suitable indication of engine speed. In one embodiment, engine speed sensor 13 is a HALL effect sensor responsive to passage thereby of a number of teeth of a gear or wheel rotating in synchronism with engine 12 to provide engine speed signal data. In an alternate embodiment, engine speed sensor 13 is a variable reluctance sensor or other known sensor operable to sense engine speed and/or position and provide a corresponding engine speed signal.

In either case, sensors 13 and 16 are preferably analog sensors, as known in the automotive and heavy duty truck industry, which provide analog signals to control computer 11, which are then converted to a digital signal by an analog-to-digital converter portion of control computer 11 (not shown). Alternatively, an analog-to-digital converter may be provided external to control computer 11. Further, the present invention contemplates utilizing vehicle and engine speed sensors that supply digital signals corresponding to sensed speed.

Control system 10 thus far described is known and may be found in many types of vehicles, and typically includes various features not described. In FIG. 1, the control computer 11 includes an output electrically connected to a fuel system 18, associated with engine 12. Fuel system 18 may be any known fuel system including one or more fuel injectors, etc., and is responsive to fuel control signals provided thereto by control computer 11 to fuel engine 12 accordingly.

Figure 3:
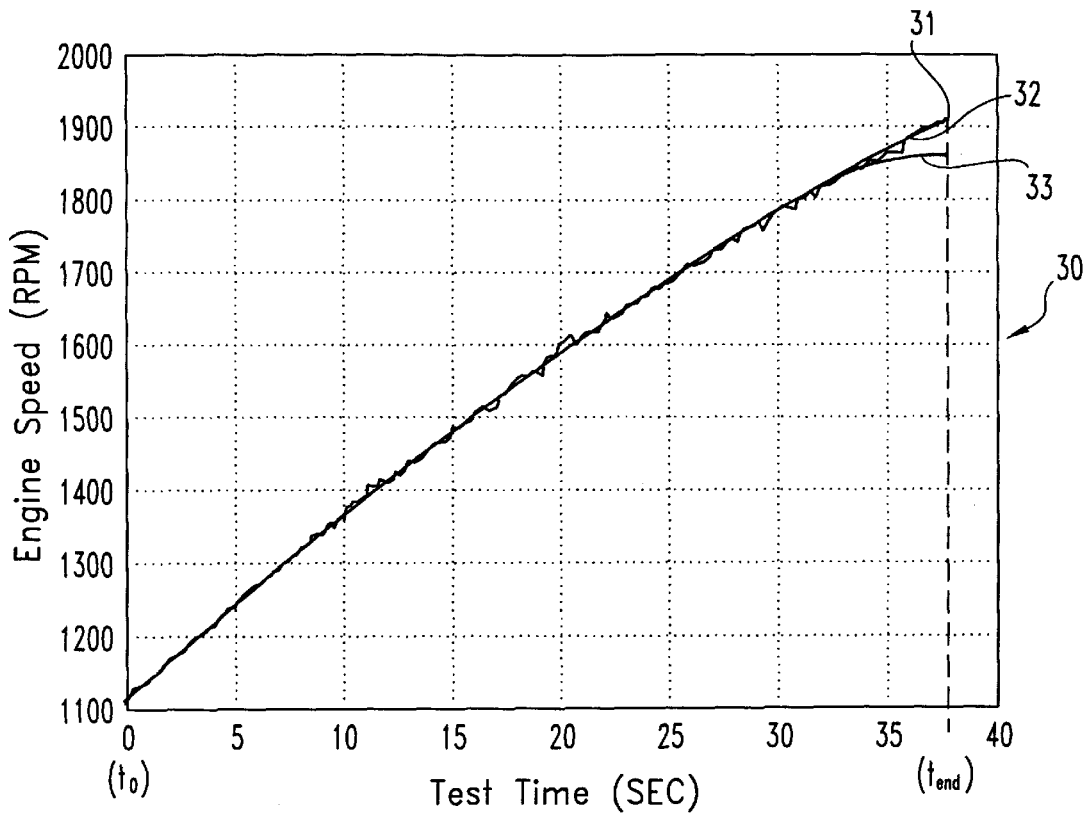
FIG. 3 is a plot of engine speed vs. time illustrating the original speed data, the filtered speed signal data without preprocessing, and the filtered speed data after preprocessing in accordance with the present invention.

A known problem associated with the collection of speed data is that the data provided by known speed sensors is typically very noisy. Referring to FIG. 3, a plot 30 of engine speed vs. time for a test vehicle is illustrated. Line 31 represents the speed data collected by an engine speed sensor (raw engine speed data). As can be observed, the data 31 is a noisy signal. In reality, plots of speed vs. time data typically result in an approximately linear relationship. However, analog sensors produce noisy data, as is known in the art. Additionally, other external factors such as friction between vehicular components, road conditions and wind gusts influence the amount of noise produced by a sensor measuring speed data.

In order to minimize the effects of the aforementioned noise on the speed signal data, the raw speed data is typically filtered prior to use. Due to the amount of noise in speed signals from vehicles, heavy filtering is often required. In one preferred embodiment, engine speed signal data is filtered by a known software simulation program, such as MATLAB using a Butterworth or other filter, which is resident in control computer 11 and/or auxiliary computer 17. However, any type of known filtering technique, which adequately addresses the noise in the speed signal data, is also contemplated. In an alternate embodiment, filtering is accomplished by any hardware device filter known in the art.

While filtering performs the desirable function of smoothing the noisy speed signal data, one disadvantage of such filtering is illustrated in FIG. 3. Line 33 of plot 30 is a plot of the engine speed signal after filtering by a typical noise filter. As can be observed from line 33, much of the signal noise is removed throughout the data range. However, the filter has a pronounced transient effect on the smoothed speed signal data near both ends of the data boundary. This transient effect results in a deviation of the filtered speed signal from the raw speed signal. According to the present invention, these deviations may be minimized as will be described in greater detail hereafter.

Figure 2:
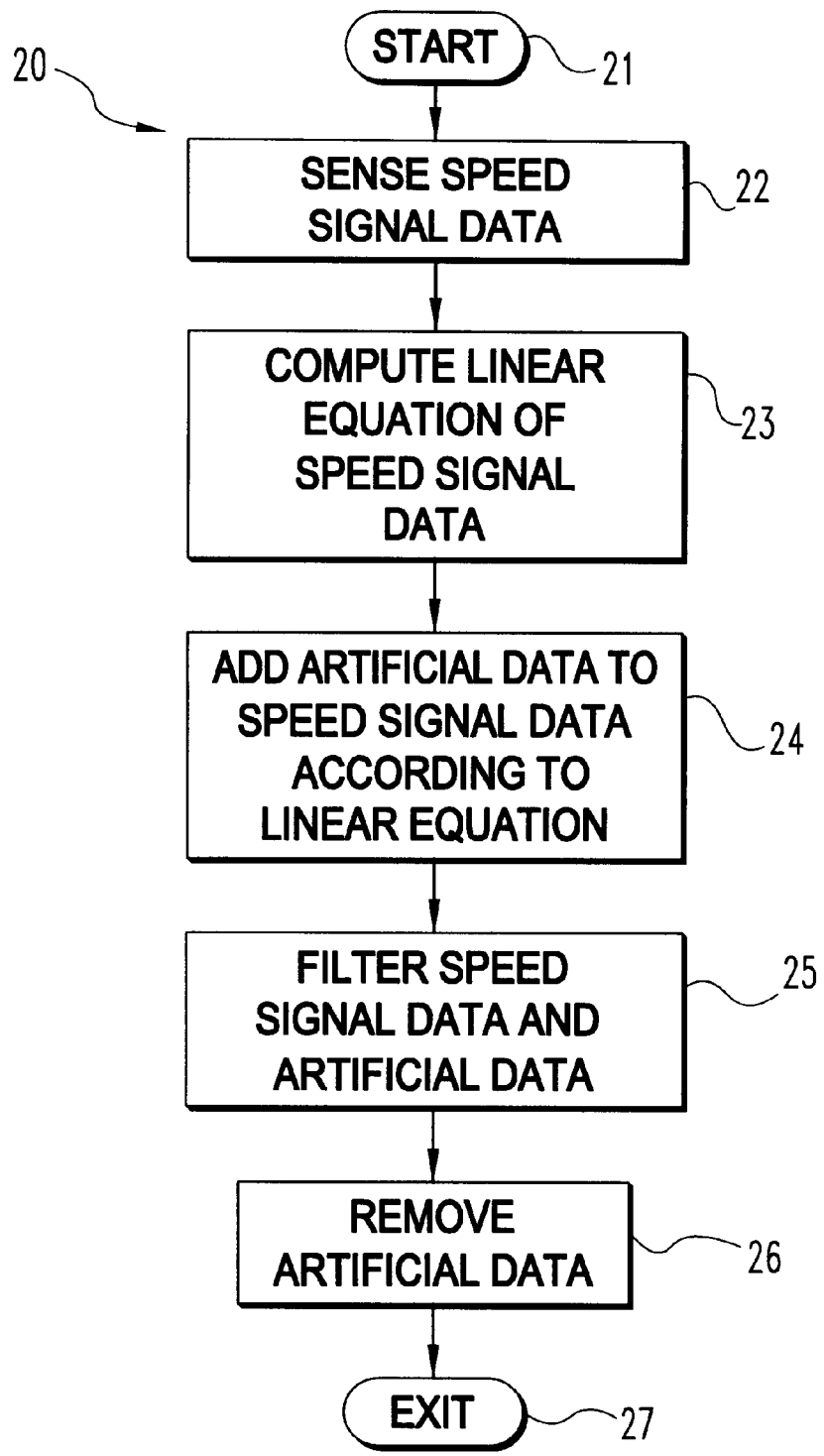
FIG. 2 is a flowchart of a preferred embodiment of a speed signal data boundary preprocessing algorithm executable by a controller of the speed signal control system of FIG. 1.

Referring now to FIG. 2, an algorithm 20 for preprocessing speed signal data to reduce or eliminate the transient filter effects is shown. Algorithm 20 may be executed by either of the control computer 11 or auxiliary computer 17. Since engine speed and vehicle speed are typically found on the J1587 Datalink Bus, both computers will thereby have access to the raw data and can share the same data via the same bus.

Algorithm 20 begins at step 21 and at step 22 actual vehicular or engine speed is sensed and provided to control computer 11 or auxiliary computer 17. Program execution continues thereafter at step 23 where a linear equation is computed from the speed data.

In one preferred embodiment, the linear equation is calculated by selecting two data points, one near a first speed reading at time $t_o$, and the other near the last speed reading at time $t_{end}$. The equation of the line intersecting these two points is then calculated. In an alternate embodiment, any two other data points are selected, so long as they provide a sufficient indication of the slope of a line through the data. In yet another embodiment, a linear equation is calculated using any known linear equation estimation technique, such as linear regression, least squares estimation, or the like, to calculate a best fit line through all or any subset of the collected data.

At step 24 artificial data is added to the sensed speed signal data in accordance with the linear equation of step 22. As one example, five artificial data points are calculated as they would have occurred before $t_o$, and five artificial data points are calculated as they would have occurred after $t_{end}$, using the linear equation computed in step 23 to calculate such artificial data points. The five artificial data points prior to $t_o$ are then added in sequence, to the beginning of the speed signal data, and the five artificial data points after $t_{end}$ are added, in sequence, to the end of the speed signal data. The resulting speed signal data thus extends from $t_{-5}$ to $t_{end+5}$. It is to be understood, however, that the present invention contemplates adding any number of artificial data points to the raw speed signal data, and the number of artificial data points added prior to $t_o$ may be different than the number added after $t_{end}$.

The data resulting from step 24, i.e. all of the actual speed data and the artificial data added thereto, are then filtered in step 25 using a known software filter, although hardware filters known in the art may alternatively be used. Once filtering is completed at step 25, step 26 removes the filtered artificial data from the filtered data resulting from step 25. In the example given above, step 26 thus entails removing the artificial (and now filtered) speed signal data points between, $t_{-5}$ and $t_o$, and between $t_{end}$ and $t_{end+5}$. The resulting filtered speed signal thus extends between $t_o$ and $t_{end}$. Program execution is then stopped in step 27.

Referring again to FIG. 3, line 32 of plot 30 illustrates data preprocessed by algorithm 20. The correction in the transient effect of the filter is apparent when line 32 is compared to line 33. Line 32 fits the original data, represented by line 31, more precisely than line 33, especially at the data boundary near $t_{end}$.

Figure 4:
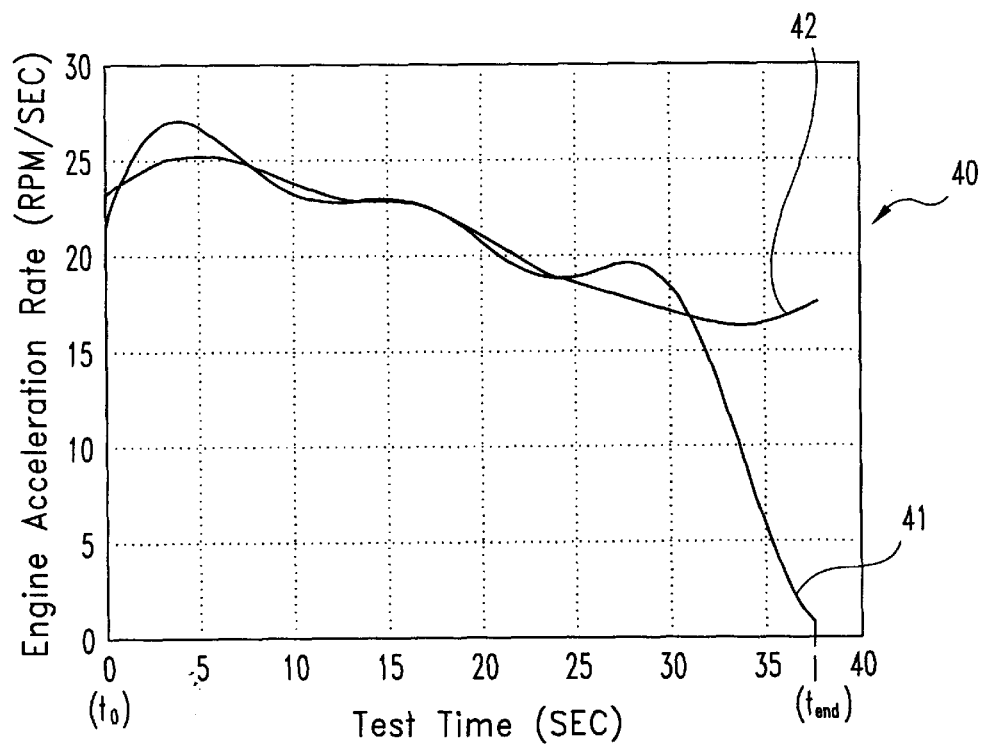
FIG. 4 is a plot of engine acceleration rate vs. time calculated using filtered engine speed signal data with no preprocessing and filtered engine speed signal data after preprocessing in accordance with the present invention.

In FIG. 4, one example of the use of the preprocessing technique according to the present invention is illustrated. Measurement of engine acceleration has been disclosed as useful in pending U.S. patent application Ser. No. 08/971,071 (pending), filed by He et al. And assigned to the assignee of the present invention, which application is hereby incorporated into this application by reference.

A plot 40 of engine acceleration, calculated from the filtered speed data of FIG. 3 is shown. Line 41 represents the acceleration rate calculated from data not processed by algorithm 20 of FIG. 2. Line 42 represents acceleration calculated by the preprocessed data. Line 42 from preprocessed data is a much more accurate representation than line 41 of the actual observed engine acceleration rate near the data boundary. Line 41 underestimates the actual acceleration at near the data boundary at $t_{end}$.

While the invention has been illustrated and described in detail in the drawings and foregoing description, the same is to be illustrative and not restrictive in character, it being understood that only the preferred embodiments have been shown and described and that all changes and modifications, which come within the spirit of the invention, are desired to be protected. For example, while the present invention has been described in relation to engine or vehicle speed signals, those skilled in the art will recognize that the techniques described herein may be used to reduce or eliminate transient effects at the data boundaries of any signal to be filtered.

What is claimed is:

1. In a speed measurement system, a method of preprocessing speed signal data provided by a speed sensor to minimize transient effects of filtering the speed data, the method comprising the steps of:

(a) sensing speed and providing speed signal data corresponding thereto;

(b) computing a linear equation of the speed signal data;

(c) adding artificial data to the speed signal data according to the linear equation;

(d) filtering the speed signal data having the artificial data added thereto; and (e) removing the filtered artificial data from the filtered speed signal data.

2. The method of claim 1, wherein the sensing step includes sensing rotational speed of a vehicular component and providing a signal corresponding thereto.

3. The method of claim 1, wherein the adding step includes adding a first number of artificial data points to one end of the speed signal data and a second number of artificial data points to an opposite end of the speed signal data.

4. The method of claim 3, wherein the first number of artificial data points is equal to the second number of artificial data points.

5. The method of claim 1, wherein the linear equation is computed by a linear regression analysis of the speed signal data.

6. The method of claim 1, wherein the linear equation is computed as a line between two data points of the speed signal data.

7. In a speed measurement system, an apparatus for preprocessing speed signal data provided by a speed sensor to minimize transient effects of filtering the speed signal data, said apparatus including:

means for sensing speed and providing a speed signal data corresponding thereto; and a computer including:
      means for processing said speed signal data;
      means for computing a linear equation of the speed signal data;
      means for adding artificial data to the speed signal data according to the linear equation;
      means for filtering the speed signal data having the artificial data added thereto; and
      means for removing the filtered artificial data from the filtered speed signal data.

8. The apparatus of claim 7, wherein the means for sensing includes means for sensing rotational speed of a vehicular component and providing a signal corresponding thereto.

9. The apparatus of claim 7, wherein the means for adding includes means for adding a first number of artificial data points to one end of the speed signal data and a second number of artificial data points to an opposite end of the speed signal data.

10. The apparatus of claim 9, wherein the first number of artificial data points is equal to the second number of artificial data points.

11. The apparatus of claim 7, wherein said means for sensing speed includes an analog sensor.

12. The apparatus of claim 7, wherein said means sensing speed includes a digital sensor.

13. The apparatus of claim 7, wherein said means for computing a linear equation includes means for computing a linear regression estimation of the speed signal data.

14. The method of claim 7, wherein said means for computing a linear equation is includes means for computing a line between two data points of the speed signal data.

* * * * *